(12) United States Patent
Stroud

(10) Patent No.: US 6,230,600 B1
(45) Date of Patent: *May 15, 2001

(54) SAW ARBOR AND GUIDED CIRCULAR SAW

(75) Inventor: Gary Arthur Stroud, Vernon (CA)

(73) Assignee: Precision Arbor Systems, Inc., Vernon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 08/831,468

(22) Filed: Mar. 31, 1997

Related U.S. Application Data

(63) Continuation-in-part of application No. 08/682,841, filed on Jul. 12, 1996, now Pat. No. 5,901,629.

(51) Int. Cl.[7] ............................. B23D 61/02; B27B 5/32
(52) U.S. Cl. ................................ 83/665; 83/676; 83/821; 30/388; 144/218
(58) Field of Search ....................... 83/425.3, 425.4, 83/504, 665, 666, 676, 698.41, 835; 30/388; 403/383; 451/342

(56) References Cited

U.S. PATENT DOCUMENTS

| | | | |
|---|---|---|---|
| 1,717,663 | 6/1929 | Checkley | 416/200 R |
| 2,600,459 | 6/1952 | Adams | 451/342 X |
| 2,634,991 | 4/1953 | Stevens | 403/383 |
| 2,831,514 | * 4/1958 | Avard | 30/388 X |
| 2,972,266 | 2/1961 | McEwan | 76/79 |
| 3,516,460 | 6/1970 | Thrasher | 83/13 |
| 3,604,819 | 9/1971 | Krahe et al. | 416/204 R |
| 3,645,304 | * 2/1972 | Thrasher | 83/821 |
| 3,734,548 | 5/1973 | Kieves | 403/353 |
| 3,892,107 | 7/1975 | Handen et al. | 403/383 X |
| 4,288,998 | 9/1981 | Schnur et al. | 464/106 |
| 4,294,562 | * 10/1981 | Mullenberg | 403/383 |
| 4,577,440 | 3/1986 | Junker | 451/342 |
| 4,730,596 | 3/1988 | Maack et al. | 451/342 X |
| 4,730,952 | 3/1988 | Wiley | 83/665 X |
| 4,747,607 | 5/1988 | Emter | 279/133 |
| 4,767,277 | 8/1988 | Buse | 416/241 A |
| 4,989,374 | 2/1991 | Rudolf et al. | 83/666 X |
| 5,058,909 | 10/1991 | Rudolf et al. | 83/666 X |
| 5,157,873 | 10/1992 | Rudolf et al. | 83/666 X |
| 5,263,283 | 11/1993 | Rudolf et al. | 451/342 X |
| 5,303,688 | 4/1994 | Chiuminatta et al. | 83/676 X |
| 5,319,886 | 6/1994 | Steere, Jr. | 83/666 X |
| 5,373,834 | 12/1994 | Chiuminatta et al. | 83/676 X |
| 5,407,296 | * 4/1995 | Brown | 403/383 |
| 5,447,086 | 9/1995 | Wittmaier et al. | 83/666 |
| 5,477,845 | 12/1995 | Zuzelo | 83/666 X |

FOREIGN PATENT DOCUMENTS

| | | |
|---|---|---|
| 3804400 | 8/1989 | (DE) . |
| 9102474 U | 8/1991 | (DE) . |
| WO 96/31310 | 10/1996 | (WO) . |

* cited by examiner

Primary Examiner—Clark F. Dexter
(74) Attorney, Agent, or Firm—Oyen Wiggs Green & Mutala

(57) ABSTRACT

An arbor for a guided circular saw has three symmetrical lobes. The lobes have end regions with profiles which follow an arc centered on an axis of rotation of the arbor. The lobes have driving regions with profiles which follow the arc of a circle centered in an opposing lobe. A saw for use with the arbor has an eye with a shape which follows the contour of the arbor. The saw is capable of floating axially along the arbor. The saw and arbor can be used to advantage in sawing machines such as edgers. The arbor provides a much larger saw contact area than do prior art arbors. In one embodiment of the invention the saw is mounted between a pair of spaced apart collars on the arbor. The collars guide the saw but are not tightly clamped to the saw.

15 Claims, 8 Drawing Sheets

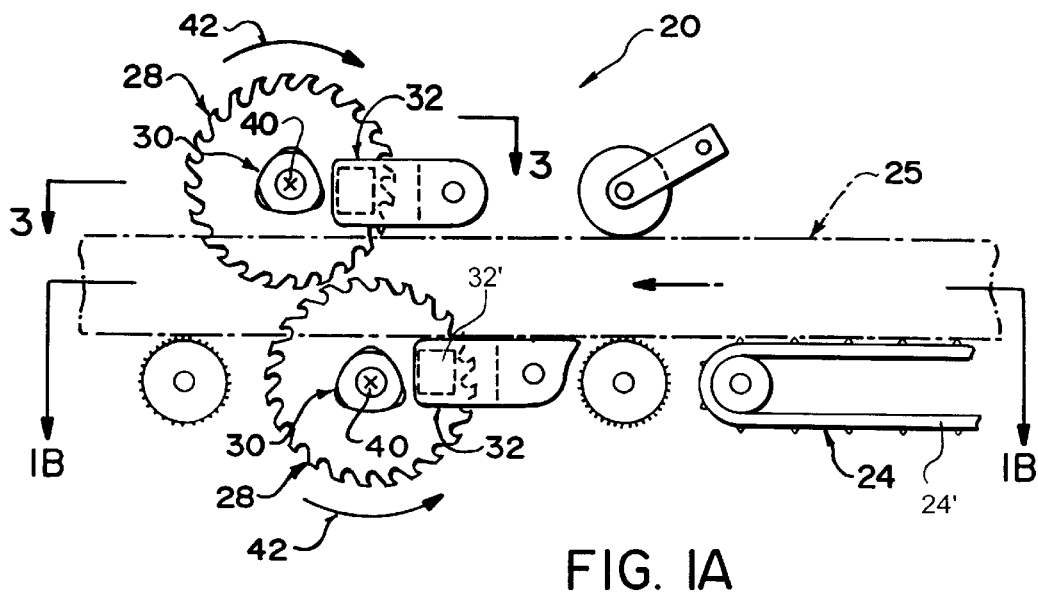
FIG. IA
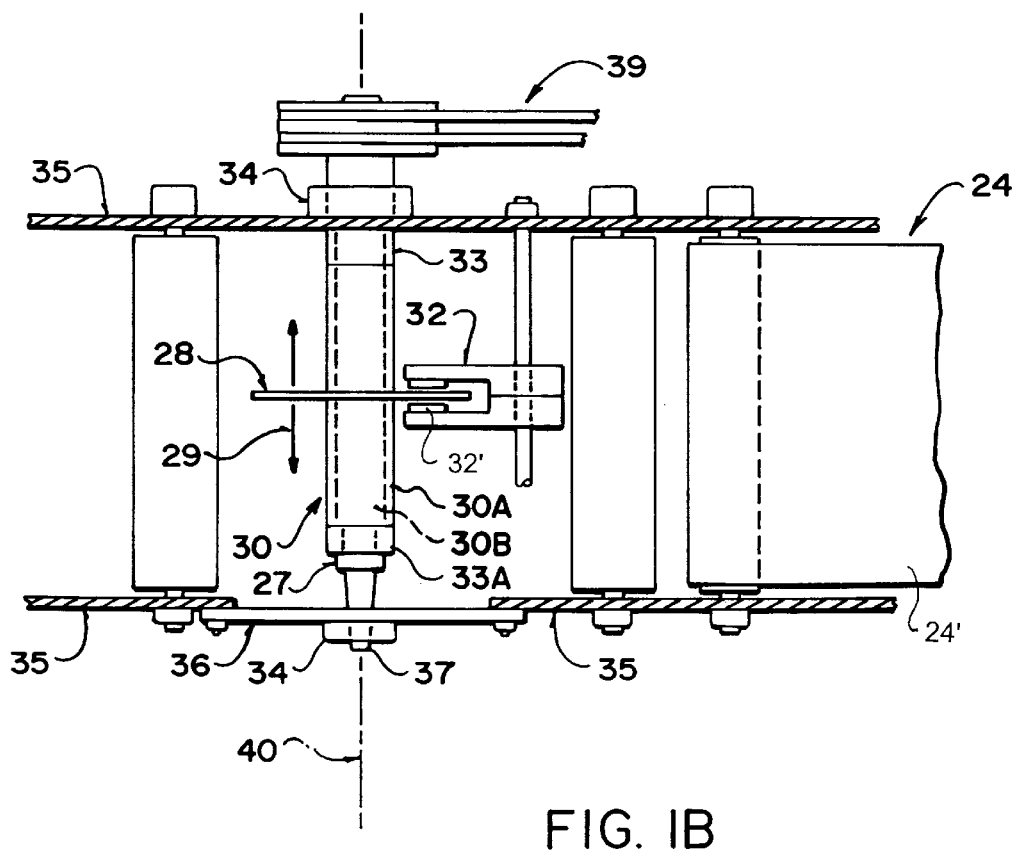
FIG. IB

US 6,230,600 B1

SAW ARBOR AND GUIDED CIRCULAR SAW

CROSS REFERENCE TO RELATED APPLICATIONS

This is a continuation in part of application No. 08/682,841 filed July 12, 1996, now U.S. Pat. No. 5,901,629.

FIELD OF THE INVENTION

This invention relates to an arbor for mounting and driving a guided circular saw, to a circular saw adapted for use with the arbor of the invention and to a sawing machine comprising the combination of the arbor and circular saw of the invention. The invention has particular application in thin kerf sawing. The invention has application, for example, in edging machines.

BACKGROUND OF THE INVENTION

U.S. Pat. No. 3,516,460 to Thrasher discloses a system for mounting circular saws on an arbor while allowing the saw to float axially on the arbor. The saw is guided between a pair of guides. The Thrasher saw has a scalloped eye opening that fits around an arbor having a large number of small rounded splines. The Thrasher system permits reasonably accurate thin cuts with the use of thin circular saws guided by saw guides. The use of guided saws which can "float" (i.e. which can move at least slightly longitudinally) on an arbor, while the arbor is turning, has become widely accepted in the saw milling industry.

Typical arbors for mounting and driving guided saws have 18 to 22 rounded splines and are 5 inches to 8 inches in diameter. There are standard sizes and configurations for such arbors. One problem that is now being experienced in the saw milling industry is that "standard" sized splined arbors from different manufacturers are often different sizes. This is partly due to the fact that conventional prior art arbors are very difficult to accurately machine with standard machining techniques. There are several manufacturers of saw arbors. To enable their blades to fit the arbors of all arbor manufacturers, saw blade manufacturers typically make the eyes in their circular saws oversized by as much as about 0.030 inches. The poor fit of a saw on an arbor can cause the saw to "pound" as the arbor turns. This happens despite the fact that most arbors used today have rounded splines, which, in theory, makes them self-centring to some degree. The pounding can spread the eye of the saw which makes the pounding even worse.

Another problem with prior art saws is that, unless the splines and saw are both perfectly machined, which is impossible, not all of the splines engage the eye of the saw when the saw is being driven.

Another problem experienced in saw mills is that the forces exerted on a saw by the lobes in a prior art arbor result in repeated shocks being delivered to the saw blade in a region concentrated around the eye of the saw. These problems are exacerbated because conventional arbors provide only a very small driving contact area between the arbor and a saw blade.

Some have attempted to reduce these problems by providing a more accurately machined saw and arbor which fit together to very close tolerances. This approach has not been entirely satisfactory because, with arbors of conventional design, close tolerances between saw and arbor tend to increase the likelihood that the saw will "bind" on the arbor and will not float freely along the arbor as is desired. Furthermore, it is not possible with common current techniques to cut the eye of a saw to an accuracy of better than about ±0.002 inches. Further, such arbors still provide only a very small contact area between the driving surfaces on the arbor and arbor contacting surfaces in the eye of the saw.

SUMMARY OF THE INVENTION

A first aspect of the invention provides a sawing machine comprising: a frame and an arbour pivotally mounted to the frame for rotation about a longitudinal axis of the arbor. The arbor comprises a saw mounting portion having a trilaterally symmetrical cross sectional profile. The profile defines three rounded lobes. Each of the lobes extends around approximately one third of a circumference of the saw mounting portion. Preferably each of the lobes has an end region in which the profile follows an arc of a circle centered on the axis. Each of the lobes has a leading edge portion in which the profile preferably follows an arc of a circle centered in an opposing one of the lobes. The sawing machine further comprises a circular saw mounted on the saw mounting portion for rotation with the arbor. The circular saw comprises an eye having a profile corresponding to the cross sectional profile of the arbor. A pair of guides, one on either side of the saw, keep the saw in a desired position. In one embodiment of the invention, the guides comprise collars mounted on the arbor at spaced apart locations one on either side of the circular saw. The collars and arbor leave the saw free to float slightly axially along the saw mounting portion between the collars.

Another aspect of the invention provides a circular saw comprising an eye. The eye has an internal profile which is symmetrical with respect to rotations of 120 degrees. The internal profile defines three rounded recesses. Each of the recesses extends around approximately one third of a circumference of the eye. The profile preferably follows an arc of a circle centered in an opposing one of the recesses in its parts between end portions of adjacent recesses.

Yet another aspect of the invention provides an arbor for mounting and driving a circular saw. The arbor comprises a saw mounting portion having a trilaterally symmetrical cross sectional profile. The profile defines three rounded lobes. Each of the lobes extends around approximately one third of a circumference of the saw mounting portion. Each of the lobes has a leading edge portion. In the leading edge portions of each lobe, the profile preferably follows an arc of a circle centered in an opposing one of the lobes.

In a preferred embodiment the profile follows an arc of a circle centered on a longitudinal axis of the arbor in end portions of the lobes. Preferably the arbor comprises a shaft extending through a bore of a sleeve bearing the saw mounting portion.

BRIEF DESCRIPTION OF THE DRAWINGS

In drawings which illustrate non-limiting preferred embodiments of the invention, FIG. 1A is a partially schematic side elevational view of a horizontal dual arbor edger equipped with circular saws and arbors according to the invention;

FIG. 1B is a partially schematic sectional top plan view thereof;

DETAILED DESCRIPTION

Figure 3:
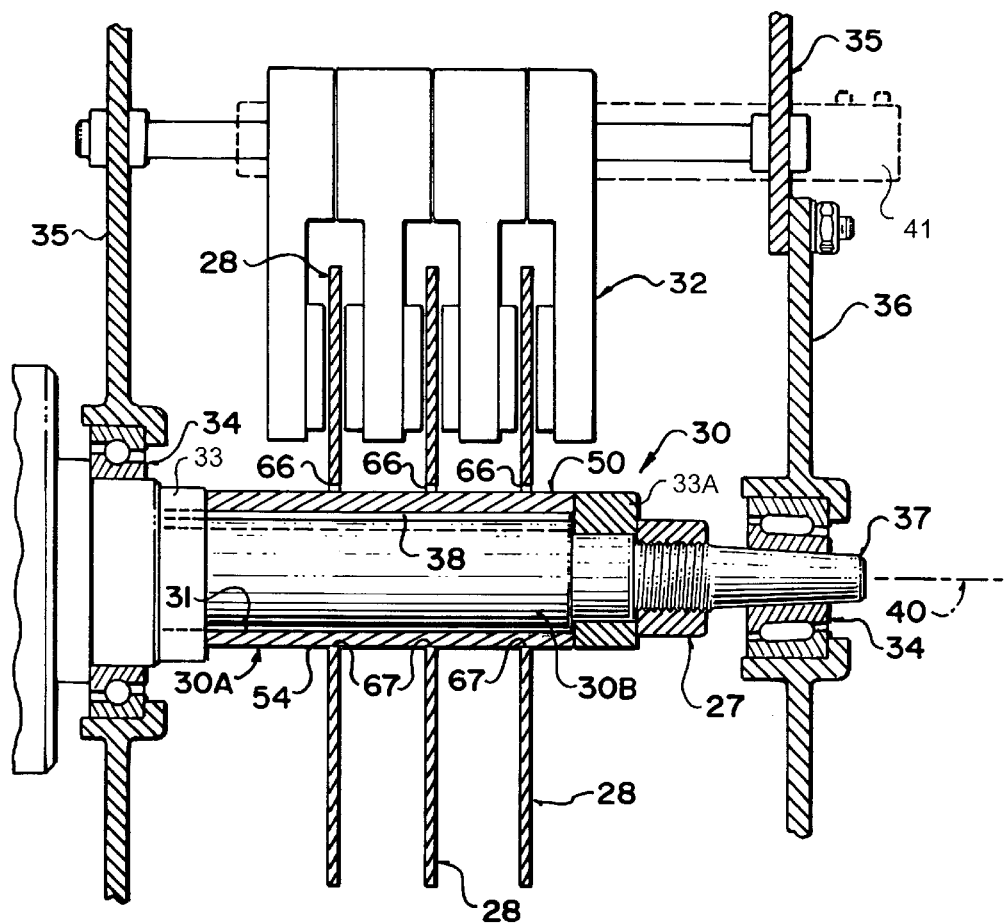
FIG. 3 is a cut away plan view of a gang of saws according to the invention in an edger.

FIGS. 1A, 1B and 3 show a horizontal dual arbor edger 20 which includes an infeed system 24 for moving a cant 25 through a gang of circular saws 28. Infeed system 24 may comprise, for example, sets of feed rolls, a conveyor 24' or a carriage. Edger 20 has upper and lower sets of saws 28. The kerfs made by the upper set of saws 28 coincide with the kerfs made by the lower set of saws 28 so that cant 25 is sliced into a number of thinner boards after it has passed through edger 20. The overall layout of edger 20 is conventional as is well known to those skilled in the art. While the arbors in the edger of FIGS. 1A and 1B are horizontal the orientation of the arbors is not important. The invention can be applied, for example, to vertical arbor sawing machines.

The saws 28 in each set of saws are mounted on an arbor 30. Each saw 28 is guided between a pair of guides 32. Guides 32 are typically faced with pads 32' of babbitt material spaced about 0.0005 inches to 0.001 inches from the desired position of each saw 28. Arbors 30 are mounted in suitable bearings 34 so that they can rotate freely about their axes 40 as indicated by arrows 42.

Preferably each arbor 30 comprises a sleeve 30A which provides a mounting area for saws 28. Sleeve 30A has a bore 31 (FIG. 2A) which receives a shaft 30B which is supported by the bearings 34. A key on shaft 30B engages a keyway 38 in bore 31 so that sleeve 30A is prevented from tiring with respect to shaft 30B. Arbor 30 could conceivably be fabricated from a single piece of material. However, if the saw mounting portion of arbor 30 is provided on a sleeve 30A, as described, then it is possible to replace the saw mounting portion of arbor 30 by replacing sleeve 30A. This is much less complicated than replacing the entire arbor 30.

Sleeve 30A is preferably mounted between spacers 33, 33A. By changing the thicknesses of spacers 33, 33A the longitudinal position of sleeve 30A on shaft 30B can be adjusted. The blade-contacting outer surface of sleeve 30A can be made to wear relatively evenly by periodically shifting sleeve 30A along shaft 30B. Sleeve 30A and spacers 33, 33A are retained on shaft 30B by suitable means, such as a locknut 27.

The outer surface of sleeve 30A on which saws 28 are mounted should be hardened to reduce wear on the portions of sleeve 30A in contact with saws 28. Preferably sleeve 30A is made of material suitable for induction hardening, such as 52100 steel. Preferably the surface of sleeve 30A is induction hardened to a hardness in the range of 62–64 on the Rockwell scale. The depth of the hardened region is typically about 0.060 inches to about 0.120 inches.

Edger 20 typically has a housing to enclose saw blades 28. The housing typically includes a number of fixed walls 35 and a movable wall 36 which can be moved to provide access to saw blades 28 and arbors 30. Movable wall 36 typically includes the bearings 34 which receive a tapered portion 37 at the end of each shaft 30B. During use, the end of arbor 30 is supported on tapered portion 37. When movable wall 36 is opened and guides 32 are retracted then saw blades 28 can be removed by sliding them off of arbor 30 at tapered end 37.

The rotation of arbor 30 about axis 40 is driven by any suitable drive unit (not shown) such as an electric motor, suitably coupled to arbor 30 by, for example, a belt drive 39. Saws 28 are free to float slightly axially on sleeve 30A of arbour 30 as indicated by arrow 29 (FIG. 1B) while remaining between guides 32. In most typical edging applications saw 28 is in the range of 17 inches to 26 inches in diameter and rotates with a rim speed of about 10,500 to about 13,000 feet per minute.

FIGS. 1A, and 1B show a single saw 28 on each arbor 30 for clarity. Modem edgers typically have several saws 28 at spaced apart positions along an arbor 30 as shown in FIG. 3. Edgers often have two or more arbors. The invention may be applied to edgers having multiple saws and/or multiple arbors. The diameter of saws 28 is not critical. The invention has application in almost all situations where a guided circular saw floats on and is driven by an arbor. Some sawing machines include means for moving the saw guides to shift one or more saws along an arbor as the arbor is rotating. The inventor considers that the saw and arbor of the invention are particularly well adapted for use in such shifting-saw edgers. FIG. 3 shows schematically an actuator 41 which constitutes a means for shifting guides 32 to move one or more saws longitudinally on arbor 30.

Figure 2A:
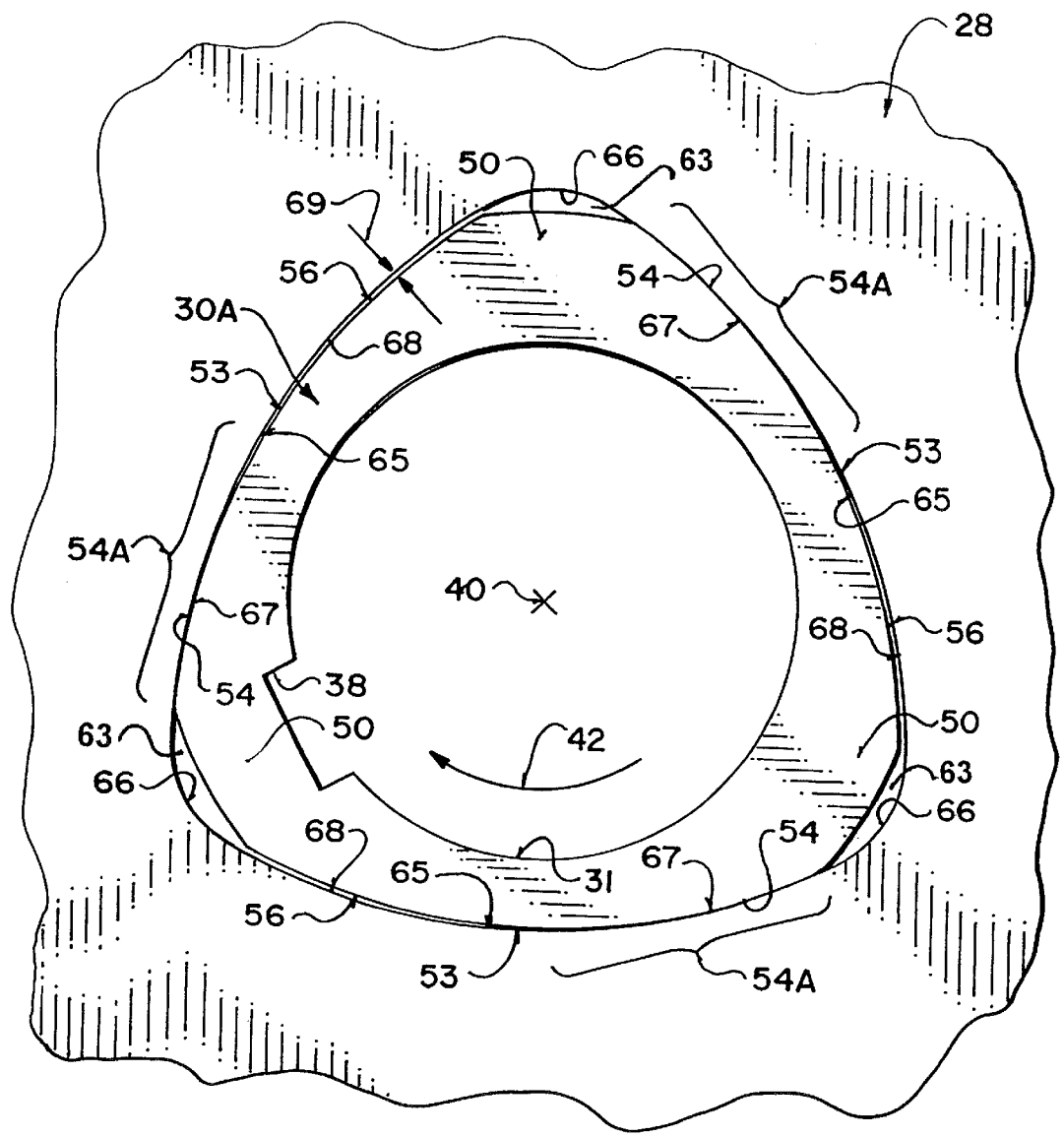
FIG. 2A is a partial side elevational view of a saw according to the invention on an arbor according to the invention.
Figure 2B:
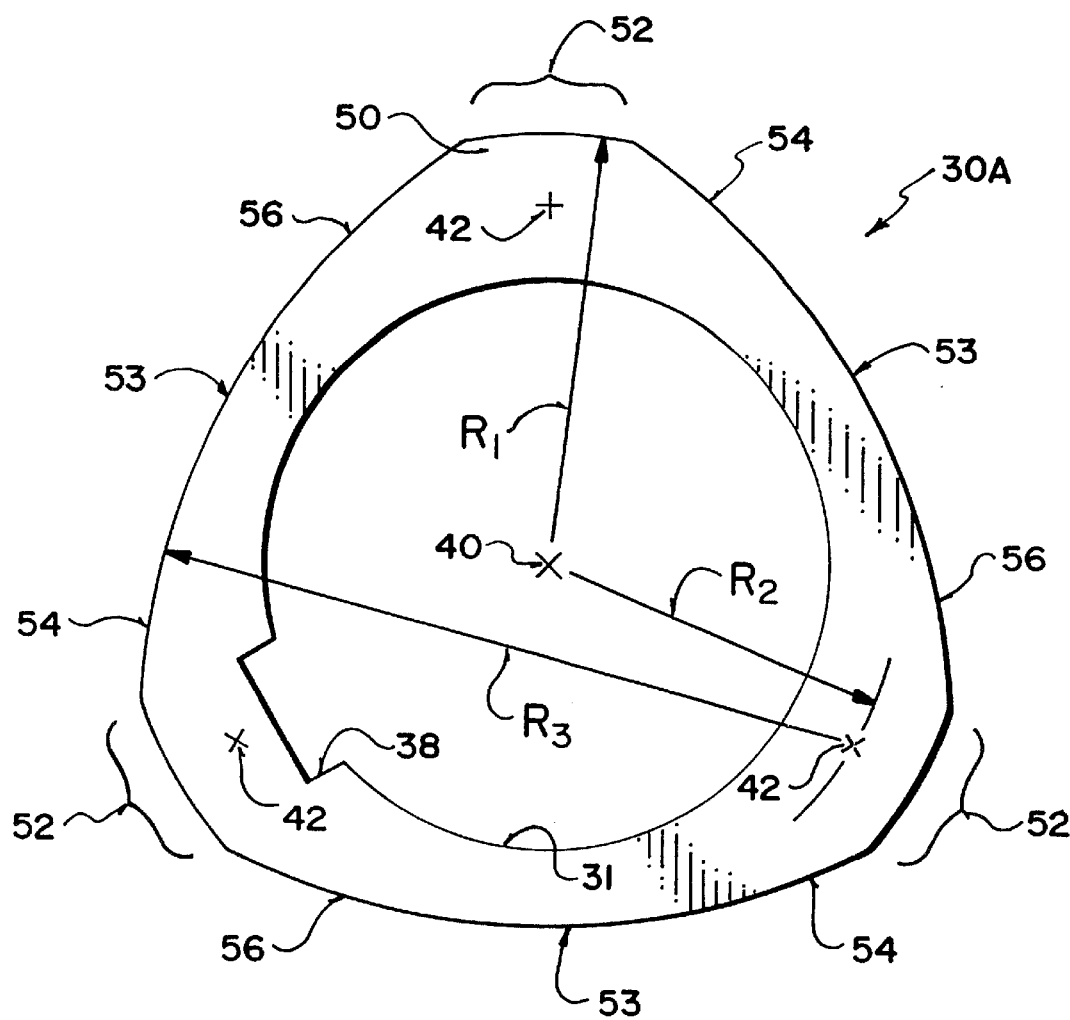
FIG. 2B is an elevational view of one end of an arbor sleeve according to the invention.
Figure 4:
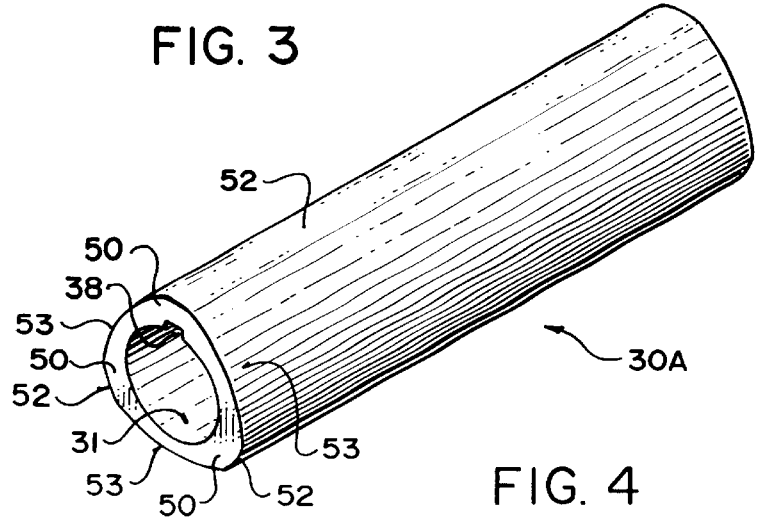
FIG. 4 is a perspective view of the arbor sleeve from the edger of FIG. 1.

As shown best in FIGS. 2B and 4, arbor 30 differs from the prior art arbors described above in that the saw mounting portion the outside of sleeve 30A has a trilaterally symmetrical cross sectional profile (i.e. the profile of the saw mounting outer surface of sleeve 30A is invariant under rotations of 120 degrees about axis 40). Sleeve 30A has three lobes 50. Each lobe 50 has an end region 52. Preferably, the cross sectional profile of arbor 30 in end regions 52 is defined by an arc of radius $R_1$ centered on the axis 40 of arbor 30. This makes it easier to provide a high quality finish on end regions 52. Each end region 52 preferably extends through an angle of about 20 degrees.

This profile of arbor 30 makes it easy to accurately machine end regions 52 and provides a smooth shape that is unlikely to bind in the eye 60 of a circular saw 28. It is readily possible to machine the end regions 52 of lobes 50 to very close tolerances using conventional techniques because the end regions 52 all lie on a cylindrical surface centered on axis 40. The smooth internal shape of eye 60 also makes saws according to the invention easier to handle than saws designed for use with prior art splined arbors. The shape of the arbor according to the invention is also advantageous because it is typically much easier to evenly induction harden the surface of an arbor according to the invention than it is to accurately harden the lobe surfaces of a lobed arbor as is described in, for example, U.S. Pat. No. 3,516,460.

Each lobe 50 has leading and trailing side regions 54, 56. Preferably, leading and trailing side regions 54, 56 are convex surface. Most preferably, the edges of arbor 30 in side regions 54, 56 are defined by arcs 53 of radius $R_3$ about points 42 which lie at the comers of an equilateral triangle and are separated from axis 40 by a distance $R_2$. In preferred embodiments of the invention, each point 42 is central to a lobe 50 which opposes the side regions 54, 56 in question.

In an arbor for mounting a 24 inch diameter edging saw, $R_1$ is typically about 3 inches, $R_3$ is typically about 5 inches, and $R_2$ is typically about 2 ½inches. This provides arbor 30 with a smooth profile that is resistant to binding in eye 60 and yet provides a positive driving action for a saw blade 28. $R_3$ should not be too short. If the outer surface of arbor 30 is too nearly circular then the eyes 60 of saws 28 may become stripped if saws 28 were to bind in a cant 25. The profile of arbor 30 is preferably generally triangular with rounded corners.

Table I lists currently preferred values of $R_1$, $R_2$, and $R_3$ for various sizes of arbor. It can be seen from table I that the ratio $R_2$:$R_1$ is preferably about 0.83:1 and the ratio $R_3$:$R_1$ is preferably about 1.66:1.

TABLE I

| $R_1$ (inches) | $R_2$ (inches) | $R_3$ (inches) |
|---|---|---|
| 2.5 | 2.083 | 4.167 |
| 3.0 | 2.5 | 5.0 |
| 3.5 | 2.917 | 5.833 |
| 4.0 | 3.333 | 6.667 |

Figure 2C:
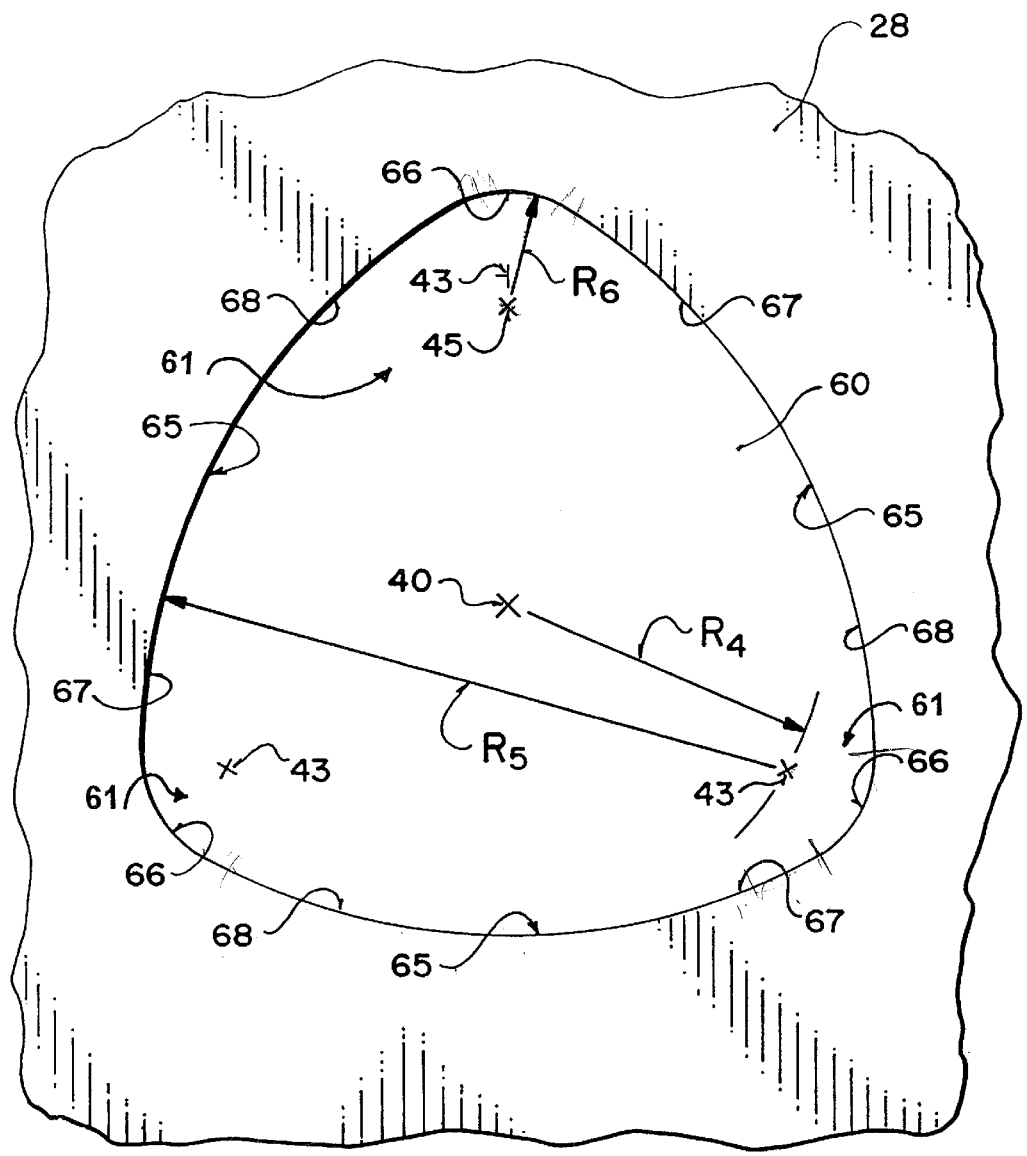
FIG. 2C is an elevational view of the eye of a saw according to the invention.

Saw 28 has an eye 60 (FIGS. 2A and 2C). Eye 60 has an internal profile that conforms with the cross sectional profile of arbor 30 in side regions 54, and 56. Eye 60 has three trilaterally symmetrically arranged recesses 61 to receive lobes 50. Each recess 61 has an end region 66 which is adjacent to end region 52 of one of lobes 50 when saw 28 is mounted on arbor 30 and leading and trailing arbor contacting portions 67 and 68 respectively adjacent to leading and trailing side regions 54 and 56 of arbor 30. Arbor contacting portions 67 and 68 preferably lie on a smoothly curved portion 65 extending between end portions 66. Preferably curved portion 65 lies on an arc of radius $R_5$ about a point 43 centered in an opposing one of recesses 61 a distance $R_4$ from axis 40. The points 43 at the centers of curvature of curved portions 65 lie at the vertices of an equilateral triangle.

Eye 60 is very slightly larger than arbor 30 to allow saw 28 to be mounted on and to float on arbor 30. Typically $R_4$ is equal to $R_2$ and $R_5$ is slightly greater than $R_3$ to provide the desired clearance between eye 60 and arbor 30. Preferably, eye 60 is dimensioned so that there is a clearance of about 0.002 to 0.005 inches, and most preferably about 0.0044 inches, between eye 60 and arbor 30 in leading and trailing regions 54, 56 when eye 60 is centered around arbor 30.

As shown in FIG. 2A, when saw 28 is driven by arbor 30, then the clearance between saw 28 and arbor 30 at a point 69 in the portion of trailing side regions 56 adjacent end regions 52 should preferably be in the range of 0.006 to 0.010 inches. Leading side regions 54 of arbor 30 should be in substantially continuous contact with leading arbor contacting portions 67 of the inner edge of saw eye 60 as indicated by 54A. Lobes 50 are preferably smoothly rounded, as shown, with no sharp corners that could cause a saw 28 to bind as it floats along arbor 30.

FIG. 2A shows an exaggerated view of an arbor sleeve 30A driving a saw 28. The leading edges 54 of lobes 50 are twisted toward, and are in firm contact with, corresponding areas in recesses 61. The trailing edges 56 of lobes 50 are pulled away from corresponding areas in recesses 61.

Because there are only three lobes 50 all the leading edges 54 of each of lobes 50 are in contact with eye 60. It is not possible for arbor 30 to be in stable engagement with eye 60 if only one or two leading edges 54 are in contact with eye 60.

Most preferably, as shown in FIGS. 2A and 2C, end regions 66 of eye 60 are rounded and do not contact end regions 52 of lobes 50 when saw 28 is mounted on arbor 30. For example, the end regions 66 of FIG. 2C can follow arcs of radius $R_6$ about points 45. Small pockets, such as meniscus shaped spaces 63 are left adjacent to end regions 52. Because end regions 66 of eye 60 do not contact arbor 30 while saw 28 is in use end regions 66 do not wear appreciably and do not cause drag if saw 28 is shifted along arbor 30. End regions 66 can be used to repeatably center saw 28 for sharpening on a sharpening jig because they do not wear appreciably. Points 45 may be, but are not necessarily, coincident with points 43.

Figure 5:
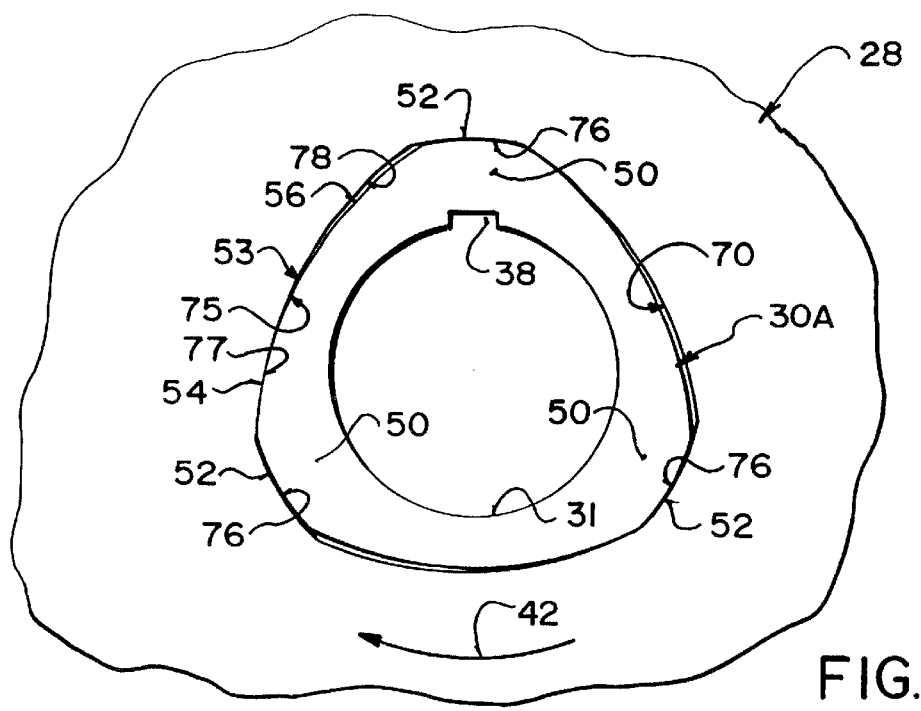
FIG. 5 is a partial side elevational view of a saw for use with the arbor of FIG. 4 having an alternative eye profile.

It can be appreciated that the shape of arbor 30 and eye 60 in end regions 52 and 66 can be varied without departing from the broad scope of the invention. For example, FIG. 5 shows a saw 28 having an eye 70 with an alternative internal profile. End regions 76 of eye 70 conform generally to end regions 52 on sleeve 30A. Contact portions 77 and 78 adjoin leading and trailing side regions 54, 56 of sleeve 30A in substantially the same manner as do contact portions 67 and 68 of eye 60 described above.

The three lobed profile of arbor 30 allows arbor 30 to couple tightly to the eye 60 or 70 of a saw 28 mounted on sleeve 30A without binding. This in turn, reduces vibration of saw 28 during cutting. Saw 28 can still slide along arbor 30 because the smooth profile of lobes 50 reduces the likelihood that lobes 50 will bind in eye 60 or 70.

The design of arbor 30 provides a large area of driving contact between saw 28 and arbor 30. The total driving contact area is three times the length of leading region 54 of lobes 50 (because there ate 3 lobes 50) multiplied by the thickness of saw 28 in regions 54A. This contact area is much greater than the contact area provided by the prior art designs noted above. The greater contact area couples saw 28 to arbor 30 more tightly than is possible with most available prior art designs and spreads out loads over larger distances on the edge of eye 60. The inventor believes that this, in turn, makes saw 28 more resistant to "pounding" and reduces the vibration of saw 28. The reduction in vibration may permit the use of thinner saws in some applications.

Figure 6:
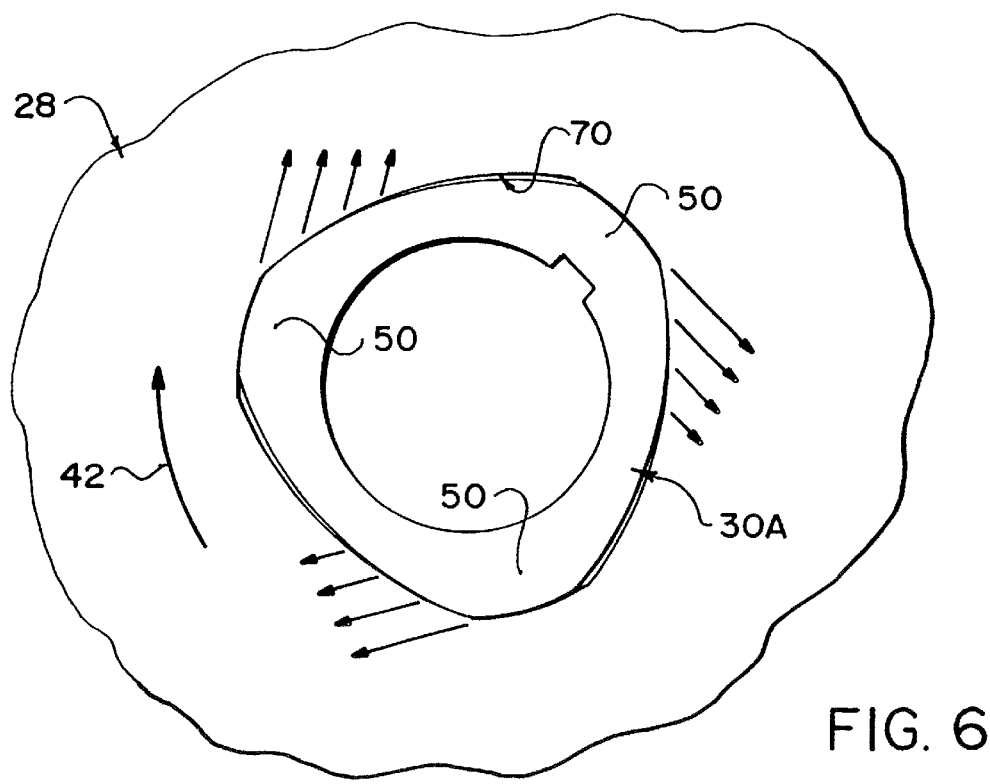
FIG. 6 is a schematic view showing the distribution of driving forces in a saw according to the invention.

As illustrated schematically in FIG. 6, when arbor 30 is in use, the driving forces exerted by leading regions 54 of arbor 30 on the eye 70 of saw 28 result in forces which are directed into the body of saw 28. In contrast, the driving forces exerted on a prior art saw mounted on prior art lobed arbor as described, for example, in U.S. Pat. No. 3,516,460, are concentrated in and around the eye of the prior art saw, particularly in the portions of the eye of the saw which extend between adjacent lobes.

The inventor has discovered that a saw and arbor according to the invention offers some unexpected benefits over prior art saws mounted on prior art arbors. For example, saws mounted on arbors according to the invention appear to require less maintenance than prior art saws. Circular saws must be periodically "tensioned". Tensioning, which is generally done by rolling or hammering the saw blade, compensates for the centripetal forces and thermal stresses caused by differential thermal expansion which act on a saw when it is running. A saw which is not properly tensioned does not run true. Saws must be periodically tensioned because the artificial stresses introduced by proper tensioning fade as the saw runs.

Prototype saws according to the invention appear to retain proper tensioning for longer than prior art saws and may even be self-tensioning, at least to some degree. For example arbors and saw blades according to the invention were installed in a 12 inch Powell™ double arbor edging machine. The saws were initially tensioned to 400". After installing the saws and letting them idle for 30 minutes it was found that the saws were tensioned to 500" tension.

Saws according to the invention on arbors according to the invention also appear to be unexpectedly accurate. For example, in a Opitmil™ canter horizontal double arbor edger, measured typical deviation with prior art saws and arbors was in the range of 0.030 inches to 0.035 inches. With saws and arbors according to the invention the deviation was reduced to the range of 0.011 to 0.015 inches. Vibration was reduced as well.

It has also been found that saws and arbors according to the invention can often be run effectively with less water lubricant than prior art saws.

Figure 7:
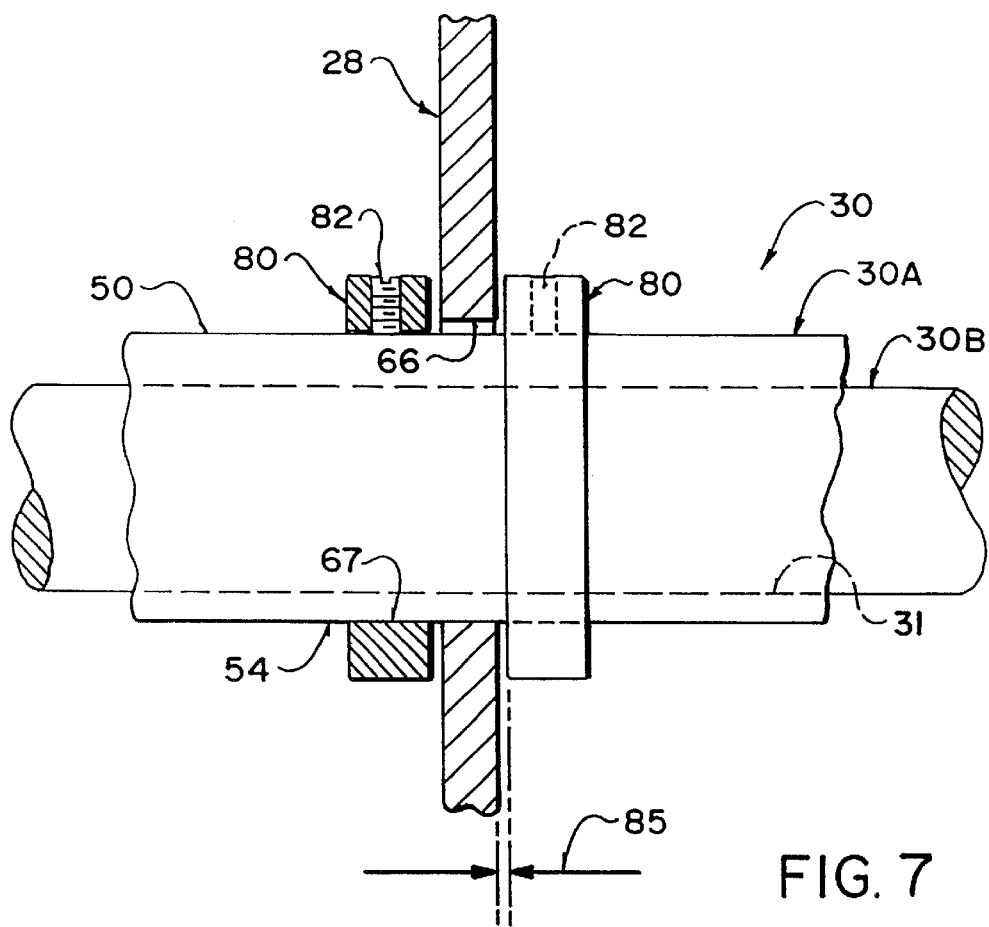
FIG. 7 is a front elevational view showing a saw mounted between a pair of collars according to an alternative embodiment of the invention.

In some applications, as shown in FIG. 7, guides 32 may be replaced with a pair of spaced collars 80. Conventional prior art collars clamp tightly against either side of a saw blade. The tight pressures exerted by conventional collars against either side of a saw blade prevent any flexing in the central portion of the saw blade. By contrast, collars 80 of FIG. 7 serve to guide saw 28. Collars 80 are clamped to arbor 30 by any suitable fastening means, such as screws 82 screwed into threaded holes in arbor 30, pins or the like. A saw 28 in the apparatus of FIG. 7 would most typically be in the range of 12 inches to 17 inches in diameter.

Collars 80 are spaced apart by a distance of slightly more than the thickness of saw 28. Preferably there is a clearance space 85 of about 0.0005 inches to 0.006 inches between saw 28 and collars 80. The clearance should be sufficient to allow saw 28 to flex slightly. This allows saw 28 to find its own position on arbor 30 between collars 80. Collars 80 should project from arbor 30 by, at least about ⅛inch to ¼inch. Collars 80 may have round outside profiles, as shown, or may have outside profiles which follow the contours of arbor 30. Collars 80 are preferably relatively small in diameter so that they do not contact the cants being sawn.

Collars 80 may optionally be faced with shims which can be replaced with shims (not shown) of different thickness. This permits the same collars 80 to be used with saw blades 28 of varying thicknesses. The shim material may be a slippery material, such as a suitable impact and heat resistant plastic.

Figure 8:
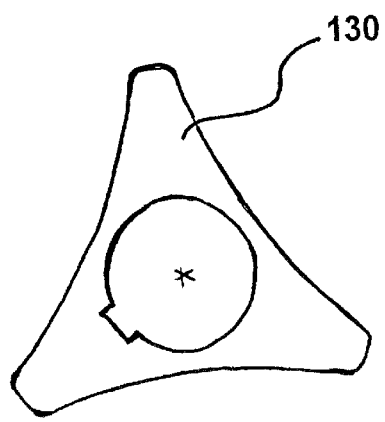
FIG. 8 is an elevational view of one end of an arbor sleeve according to a non-preferred alternative embodiment of the invention; and, FIG. 9 is a partial side elevational view showing a collar having a profile which follows a profile of a saw arbor according to the invention.
Figure 9:
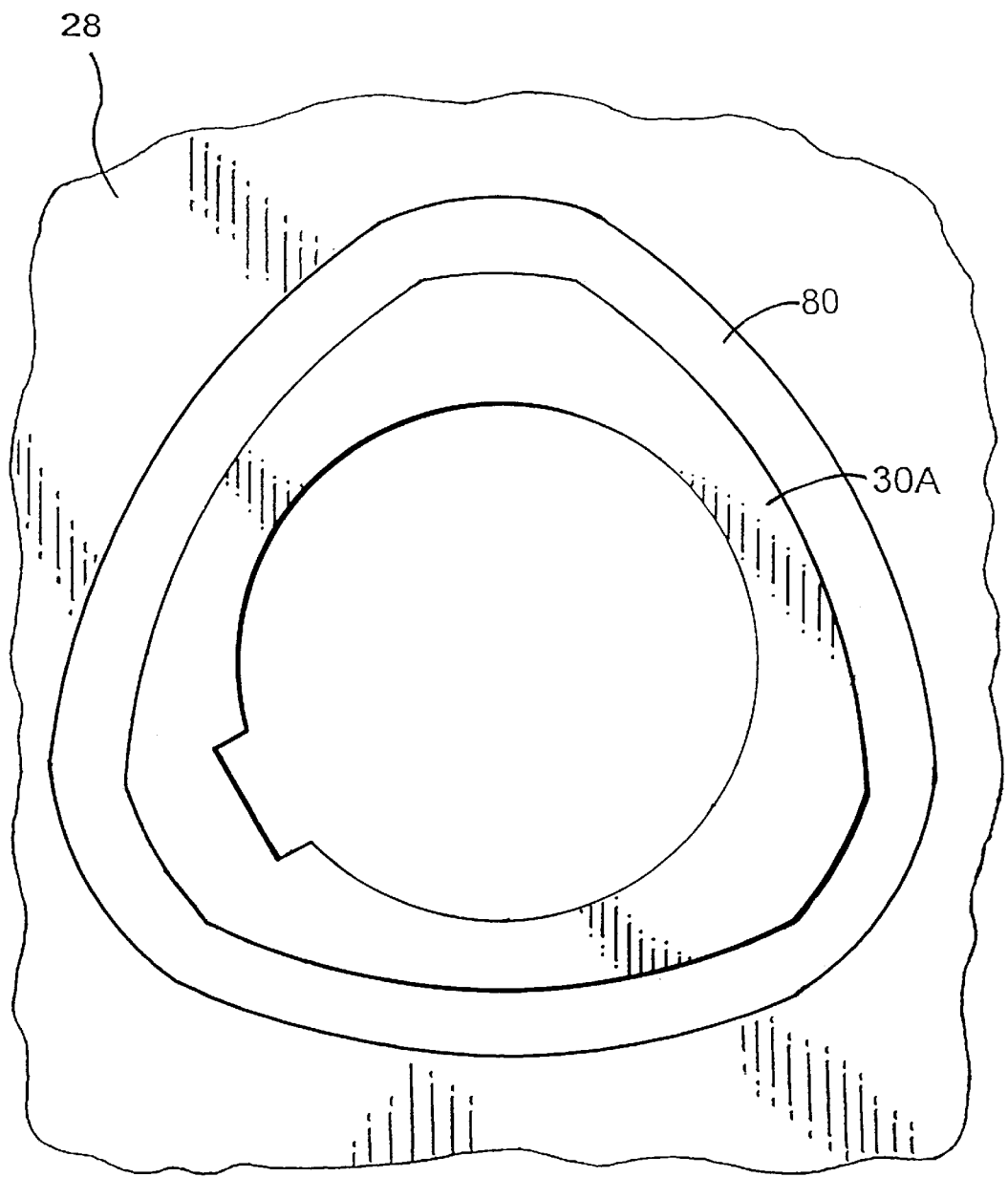

As will be apparent to those skilled in the art in light of the foregoing disclosure, many alterations and modifications are possible in the practice of this invention without departing from the spirit or scope thereof. For example, while arbor 30 should have a trilaterally-symmetrical cross sectional profile which provides three rounded lobes, and while the preferred shape for the profile of arbor 30 is as shown, the shape of the lobes may be varied somewhat without departing from the broadest scope of the invention. For example, FIG. 8 is a section through an arbor 130 according to a non-preferred variant of the invention in which the leading and trailing edge portions of the lobes are slightly concave. The curve of the leading and trailing edge portions in FIG. 8 are exaggerated for clarity. Some of the advantages of the invention over the prior art might be achieved through use of a three lobed arbor 130 generally as shown in FIG. 8. Accordingly, the scope of the invention is to be construed in accordance with the substance defined by the following claims.

I claim:

1. A sawing machine comprising:
   (a) a frame;
   (b) an arbor rotatably mounted to said frame for rotation about a longitudinal axis of said arbor, said arbor comprising a saw mounting portion having a trilaterally symmetrical cross sectional profile, said profile defining three rounded lobes, each of said lobes extending around approximately one third of a circumference of said saw mounting portion, each of said lobes having a leading side portion, in each of said leading side portions, said profile following an arc of a circle centered on a point in an opposing one of said lobes, said points forming an equilateral triangle centered on said axis;
   (c) a circular saw mounted on said saw mounting portion for rotation with said arbor, said circular saw comprising an eye having a profile substantially conforming to said profile of said leading side portions of said arbor; and,
   (d) a guide on either side of said saw for maintaining said saw in a desired position.

2. The sawing machine of claim 1 wherein said lobes are bilaterally symmetrical and each of said points is located on a radial centerline of one of said lobes.

3. The sawing machine of claim 1 wherein said guides comprise a pair of collars mounted to said saw mounting portion at spaced apart locations, one on either side of said circular saw, wherein said collars are spaced apart sufficiently to allow said saw to float slightly axially along said saw mounting portion between said collars.

4. The sawing machine of claim 3 wherein said collars are spaced apart by a distance in the range of 0.0005 inches to 0.006 inches greater than a thickness of said saw.

5. The sawing machine of claim 4 wherein said collars have an outer profile which follows said profile of said arbor.

6. The sawing machine of claim 4 wherein said collars project from said arbor by a distance in the range of ⅛inch to ¼inch.

7. The sawing machine of claim 1 wherein end regions of said lobes are spaced apart from corresponding adjacent portions of said eye of said saw.

8. The sawing machine of claim 7 wherein said end regions of said lobes lie on an arc centered on said axis of said arbor.

9. The sawing machine of claim 8 wherein said end regions of said lobes are spaced apart from said adjacent portions of said eye of said saw by meniscus shaped gaps.

10. The sawing machine of claim 1 wherein end regions of said lobes lie on an arc centered on said axis of said arbor.

11. The sawing machine of claim 1 comprising an actuator coupled to said guides for shifting said guides to move said saws axially along said arbor while said arbor is rotating.

12. A circular saw comprising an eye, said eye having an internal profile which is symmetrical with respect to rotations of 120 degrees, said internal profile defining three rounded recesses, each of said recesses extending around approximately one third of a circumference of said eye wherein said profile has arbor contacting portions wherein, in each of said arbor contacting portions, said profile follows an arc of a circle centered on a point in an opposing one of said recesses, and wherein each of said points lies on a corner of an equilateral triangle, said triangle centered on an axis of rotation of said saw, said arbor contacting portions lying between adjacent pairs of end portions of said recesses.

13. The circular saw of claim 12 wherein each of said recesses is bilaterally symmetrical and each of said corners of said triangle lies on a radially extending centerline of one of said recesses.

14. The circular saw of claim 13 wherein, for each of said recesses, said end portion follows an arc of a circle centered in said recess.

15. The circular saw of claim 13 wherein a diameter of said saw is in the range of 12 inches to 26 inches.

* * * * *